Sept. 11, 1951 D. W. WOODWARD 2,567,750

LIGHT SENSITIVE ELEMENTS FOR COLOR PHOTOGRAPHY

Filed Oct. 25, 1945

INVENTOR.
DAVID W. WOODWARD
BY
Lynn Barratt Morris
ATTORNEY.

Patented Sept. 11, 1951

2,567,750

UNITED STATES PATENT OFFICE 2,567,750

LIGHT SENSITIVE ELEMENTS FOR COLOR PHOTOGRAPHY

David W. Woodward, Wilmington, Del., assignor to E. I. du Pont de Nemours & Company, Wilmington, Del., a corporation of Delaware Application October 25, 1945, Serial No. 624,587

4 Claims. (Cl. 95—2)

Figure 1:
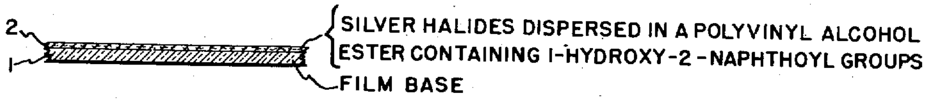

This invention is concerned with color photography and more particularly with photographic elements which have light-sensitive silver halides dispersed in hydrophilic layers composed of color-forming polyvinyl esters and to materials therefor.

An object of this invention is to provide new light-sensitive elements for color photography. Another object is to provide such elements which are free from haze and graininess after processing. A further object is to provide color-yielding elements with new thin light-sensitive layers composed of a color former which also serves as a hydrophilic binding agent for the silver halide grains. Another object is to provide a new class of multilayer color-yielding film elements of high sensitivity and good flexibility which yield a high color density per molecule of silver salt reduced. A still further object is to provide such elements which will faithfully reproduce scenes in their natural colors with complete clarity and good definition. Another object is to provide new polymeric color formers. Still other objects will be apparent from the following detailed description of the invention.

The novel photographic elements of this invention comprise a support carrying at least one layer which is essentially composed of color former-substituted carboxylic acid ester of a vinyl alcohol polymer and finely divided silver halide grains which are uniformly dispersed throughout the polymer. The layers may also contain small amounts of emulsion sensitizers or optical sensitizing agents, e. g., cyanine and styryl dyes, etc.

The color former-substituted esters of vinyl alcohol polymers consist of two chemically joined components (1) a color former nucleus and (2) a vinyl alcohol polymer chain, each color nucleus being joined through an ester linkage or group to a separate carbon atom of the vinyl alcohol polymer chain. Each molecule of the vinyl alcohol polymer thus has a plurality of color former nuclei attached to it through ester linkages. The elements contain light-sensitive silver salts dispersed in the color former-substituted carboxylic acid esters of vinyl alcohol polymers, which may be prepared by precipitating a silver halide by admixture of a soluble silver salt and a soluble halide in a solution of one of such color-forming polymers. Alternatively, preformed silver halides may be dispersed in a solution of the polymer.

The special class of color former-substituted esters of vinyl alcohol polymers useful in preparing the novel color-yielding elements are vinyl alcohol polymers having the group $$-\underset{\underset{O}{\|}}{C}O-AQ$$

where A is a single covalent bond or a bivalent organic radical and Q is a color former or dye intermediate nucleus as hereinafter described, replacing a portion of the hydroxyl groups of the vinyl alcohol polymer. These products in which the color former nuclei constitute an integral portion of the polymer are prepared so that they contain sufficient free hydroxyl groups to make them hydrophilic and are chemical entities as distinguished from physical mixtures of dye intermediates or color formers and colloids. They are substantially colorless and are capable of forming self-supporting films which are strong and flexible. This eliminates difficulties arising from different solubilities and compatibilities of such separate compounds and makes leaching or migration of the color formers or dyes impossible.

The hydrophilic polymeric color formers used in this invention can be advantageously prepared by several common chemical processes: (1) esterification of a vinyl alcohol polymer with a color former containing a carboxylic acid (—COOH) group using an acidic catalyst, e. g., HCl, $H_2SO_4$, etc.; (2) esterification of a vinyl alcohol polymer with a color former containing a carboyylic acid halide, (—COCl or —COBr) using an acid binding agent, e. g., alkali metal hydroxides, carbonates, etc. or organic bases such as pyridine, triethylamine, etc. to remove the hydrogen halide formed; (3) acid or alkali catalyzed ester interchange between a vinyl alcohol polymer and a color former containing a lower aliphatic ester group, e. g., a $—COOC_2H_5$ group; (4) esterification of a vinyl alcohol polymer by any of the above methods with an acid or derivative thereof which is not a color former but has a reactive group, e. g., a halogen atom, an amino, mercapto, or hydroxyl group, etc., that may be replaced by or converted to or substituted by derivatives of a color former having a group reactive with one of the above-listed substituents, e. g., a color former having a reactive halogen atom, amino group, mercapto group, sulfinic acid, sulfonic or carboxylic acid halide, etc. The color former component is used in such an amount that a plurality of ester groups are present in each molecule of the finished color-forming colloid.

The term "color former" as used herein refers to compounds or nuclei in compounds which are capable of condensation or coupling with oxidized primary aromatic amino color developing agents to form quinonimine or azomethine dyes or with diazotized aromatic amines to form azo dyes.

Color formers of the above type are well-known in the dye and color photography art and usually contain as the active group a structure which may be represented by $$X-(\overset{|}{C}=\overset{|}{C})_n-\overset{|}{C}=\overset{|}{C}H$$

where X is HO— or RHN—, wherein R is H or an aliphatic group, and $n$ is 0 or 1. The "free" or "dangling" valence may, of course, be satisfied by any of a large number of atoms or groups, e. g., hydrogen, halogen, carboxylic or sulfonic acid groups and their derivatives, fused rings, alkyl, aryl, alkoxy, aryloxy, etc. The hydrogen atom in the formula may be replaced by groups readily displaced in the coupling reaction, e. g., halogen atoms, carboxylic or sulfonic acid groups. This group is found in the active methylene color formers or dye intermediates and in aromatic hydroxyl and amino compounds and includes the reactive ethenol, aminoethenyl, 4-hydroxy- and 4-amino-1,3-butadienyl groups. These groups occur in phenols, naphthols, aromatic amines, acylacetamides, beta-ketoesters, pyrazolones, homophthalimides, cyanoacetyl compounds, etc. The reactive ethenol group as represented by $$HO-\overset{|}{C}=CH-$$

occurs in phenols and naphthols which couple in the ortho position and in the alkali soluble or enol form of most active methylene dye intermediates or color formers. These active methylene groups ($-CH_2-$) have a hydrogen rendered mobile by the proximity of certain unsaturated groups, for example, $-NO_2$, $$-\overset{|}{C}=O,\quad -\overset{|}{C}=N-$$

$-C\equiv N$, and others. The $-CH_2-$group is usually present between two such groups, e. g., $-COCH_2CO-$, $-COCH_2CN$, $$-COCH_2\overset{|}{C}=N-$$

in a cyclic or acyclic system. The enol forms of these examples are $$HO\overset{|}{C}=CH-CO-,\quad HO-\overset{|}{C}=CH-CN,$$

$$HO\overset{|}{C}=CH-\overset{|}{C}=N-$$

respectively.

The reactive amino ethenyl group $$RHN-\overset{|}{C}=CH-$$

occurs in aromatic amino compounds which couple in the ortho position.

The 4-hydroxy- and 4-amino-1,3-butadienyl groups represented as $$HO-\overset{|}{C}=\overset{|}{C}-\overset{|}{C}=CH-\quad \text{and}\quad RHN-\overset{|}{C}=\overset{|}{C}-\overset{|}{C}=CH-$$

occur in phenolic, naphtholic and aromatic amino compounds which couple in the para position.

The term "vinyl alcohol polymer" as used in this application includes the well-known hydroxylated polymers obtainable by polymerizing a vinyl ester, e. g., vinyl acetate, vinyl propionate, vinyl butyrate, vinylchloroacetate, etc., alone or with minor portions, i. e., 10% or less of an unsaturated interpolymerizable compound followed by partial or complete hydrolysis and, if desired, by further reaction to introduce minor portions of other modifying groups, e. g., acetal, ester, or ether groups, etc. The term "polyvinyl alcohol" is used to include completely hydrolyzed or substantially hydrolyzed (viz. 85% or more) polyvinyl esters, e. g., polyvinyl acetate, polyvinyl propionate, polyvinyl butyrate, polyvinylchloroacetate, obtainable by polymerizing the corresponding monomers alone, followed by hydrolysis. Such polymers have a chain consisting mainly of $$-CH_2\overset{|}{C}HOH$$

groups. Hydrophilic polymers useful in preparing the products of this invention, contain the unit $$-CH_2-\overset{|}{C}HOH$$

representing at least 50% of the polymer chain, that is for every 100 chain atoms there are at least 25 hydroxyl groups. Preferably said unit represents at least 80% of the polymer chain, i. e., there are 40 or more hydroxyl groups for every 100 chain atoms. Additionally it is preferred that in the final hydrophilic color-forming polymer, there are at least 25 and preferably 40 hydroxyl groups for each 100 chain atoms and that the polymer itself consists of at least 60% and preferably at least 80% by weight of $$-CH_2\overset{|}{C}HOH$$

groups so that they will be of the desired permeability-solubility characteristic as herein defined. It is also preferred that between 1 and 15 color-forming ester groups shall be present for each 100 vinyl alcohol residues. The preferred vinyl alcohol polymer and hydrophilic color forming polyvinyl esters are highly polymeric, that is, they have a polymer chain in excess of 200 carbon atoms and form strong unsupported films when dry. Products having these characteristics may be represented by the formula $$(\overset{|}{C}H_2\overset{|}{C}HOH)_x(\overset{|}{C}H_2\underset{OCOAQ}{\overset{|}{C}H})_y(\overset{|}{C}H_2\overset{|}{C}HR)_z$$

where Q is a dye intermediate-containing group, A is a single covalent bond or a bivalent organic radical, R is H, $CH_3$, —Oalkyl, etc., and $y=\frac{1}{100}x$ to $\frac{3}{20}x$; $z=0$ to $\frac{1}{20}x$ and $x+y+z$ is greater than 100.

It has been found that the color-former-substituted carboxylic acid esters of vinyl alcohol polymers of this invention are suitable for use in preparing a wide range of color-yielding elements. Among the properties which recommend these new hydrophilic color forming polyvinyl esters for such use, the following are important: (1) ability to form strong coherent unsupported films, (2) ready permeability to water and photographic processing solutions at temperatures in the range of 15° to 25° C., (3) insolubility and freedom from softening in water at moderate temperatures, e. g., below 30° C., (4) transparency and freedom from color, (5) a relatively high softening point, e. g., above 50° C., (6) adequate solubility in solvents, e. g., water, water-ethanol, etc., for coating, (7) freedom from adverse action on radiation-sensitive silver salts, and (8) ability to disperse and prevent coagulation or sedimentation of silver salts.

When the polymeric ester color formers of the present invention are associated with light-sensitive silver halides, they combine not only the above properties, but, in addition, function as chromogens. In fact, the substitution of color former groups is controlled so as to contribute not only adequate color-forming capacity, but also a portion of desired solubility-permeability balance required of a satisfactory carrier for light-sentive silver halides.

The introduction of color former ester groups in controlled amounts usually reduces the water-solubility. However, if the color-forming group contains a solubilizing group, the solubility of the final product may be increased slightly. If in any one polymer the color former substitution which gives the optimum color on chromogenic development does not yield the desired solubility, this may be corrected by the introduction of other groups designed to have the proper solubilizing or insolubilizing effect. For instance, acetal formation with benzaldehyde decreases water solubility, while with benzaldehyde-o-sulfonic acid the water solubility is increased. However, a preferred method for securing the desired physical properties of the final product is by choice of the vinyl alcohol polymer employed in the synthesis. Thus to increase the solubility, a polymer forming an aqueous solution of lower viscosity may be used, while a decrease in solubility may be obtained by employing an interpolymer containing about 5% of an olefin, e. g., ethylene, vinyl halide, e. g., vinyl chloride, acrylate or methacrylate, e. g., methyl methacrylate, etc.

Color-yielding compositions can advantageously be made by dissolving these novel hydrophilic polymeric dye intermediate esters of polyvinyl alcohol in a solvent therefor, e. g., water containing 20% of a water-miscible, volatile organic solvent, e. g., methanol, ethanol or acetone, adding a water-soluble inorganic halide and a solution of water-soluble silver salts, e. g., silver nitrate. Silver halides are thereby precipitated in the hydrophilic dye intermediate solution and a light-sensitive colloid composition results. This composition can be further treated to improve the light-sensitive properties of the composition, that is, it can be coagulated, washed, ripened, freed from excess soluble salts, adjusted to the correct pH and diluted and then coated. Various types of sensitizing dyes which modify the spectral sensitivities of the resulting emulsion can be added prior to coating. Similarly emulsion sensitizers, ripening agents, preservatives, hardeners and other emulsion constituents can be added at various stages prior to coating. The final solution is coated onto a support and, after drying, the resulting element can be exposed and processed to colored images in the same way that a film containing gelatin silver halide-color former layers can be processed.

The degree of substitution of the color former nuclei on the polymer is capable of wide variations, depending upon the reactants and the reacting conditions. However, it is preferred to use hydrophilic color-forming polymers having a relatively high percentage of color former nuclei since these produce the maximum color density obtainable from the amount of silver salts reduced by the color developer.

The invention will be further illustrated but is not limited by the following examples wherein all temperatures are centigrade, all parts are by weight, and all solutions aqueous unless otherwise indicated. All operations where a light-sensitive material is used are conducted under conditions which will not expose or cause fogging of the sensitive silver salts.

*Example I*

A mixture of 88 parts of finely divided polyvinyl alcohol (having a 4% solution viscosity of 18–24 centipoises at 20° obtained by complete hydrolysis of a polyvinyl acetate), 150 parts of anhydrous dioxane and 45 parts of pyridine are stirred at 45° while adding 52 parts of 1-hydroxy-2-naphthoyl chloride dissolved in 50 cc. of dioxane during two hours. At the end of five hours the mixture is filtered, washed by decantation in four changes of 500 parts each of acetone, four changes of 500 parts each of methanol, then filtered and washed on the filter with 500 parts of acetone. The final yield is 100 parts of a nearly colorless powder which has the following probably structure:

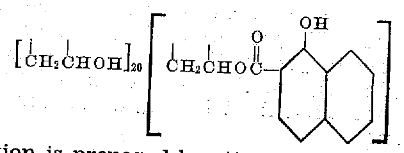

A solution is prepared by stirring at 70° for one hour 10 parts of this polymer, 40 parts of ethanol, 150 parts of water and sufficient sodium hydroxide to raise the pH to 8. To one-half of this solution is added 31 parts of 3 N ammonium bromide and 2 parts of 0.5 N potassium iodide. This mixture is stirred at 40° while adding a solution of 29 parts of 3 N silver nitrate, 50 cc. of water and 17 parts of 28% ammonium hydroxide during one minute. After stirring for a total of one-half hour, 150 parts of 15% sodium sulfate solution is added. The precipitated silver halide-color former emulsion is washed for one hour in running water after which the excess water is drained off. The remainder of the original polymer solution is then added and the mixture stirred at 65° for one-half hour. After cooling to 25°, the emulsion is coated on baryta sized white paper and on cellulose acetate film base. The resulting paper and film are exposed to form latent images, then developed in a solution of the following composition:

| | Parts |
|---|---|
| p-Aminodiethylaniline hydrochloride | 2 |
| Sodium sulfite (anhydrous) | 10 |
| Sodium carbonate (anhydrous) | 20 |
| Potassium bromide | 2 |
| Water | 1000 |

prepared by dissolving the ingredients in 500 pts. of water and diluting to 1000 parts. The paper and film are then washed, bleached in 4% potassium ferricyanide, fixed in 25% sodium thiosulfate and washed. The resulting paper and film contain a bright, strong, blue-green negative quinoneimine dye image.

The photographic film of this example is illustrated in the accompanying drawing wherein the cellulose acetate film base 1 is coated with light-sensitive layer 2 composed of light-sensitive silver salts dispersed in a polyvinyl alcohol having a plurality of hydrogen atoms on alcohol groups replaced by a 1-hydroxy-2-naphthoyl radical.

Figure 2:
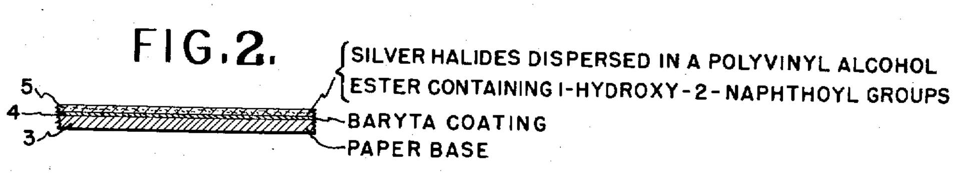

The photographic paper of this example is illustrated in Fig. 2 of the drawing wherein a paper base 3 is provided with a baryta size-coating 4 which, in turn, is provided with a coating 5 of light-sensitive silver halides dispersed in a polyvinyl alcohol having a plurality of hydrogen atoms on hydroxyl groups replaced by a 1-hydroxy-2-naphthoyl radical.

*Example II*

A mixture of 500 parts of polyvinyl alcohol (see Example I), 785 parts of chloracetic acid and 1040 parts of dioxane is stirred at 80° for six hours, filtered and washed in six changes of 2000 parts each of acetone during 48 hours, then dried to give 540 parts of a white powder soluble in hot 20% ethanol. This material contains 2.5% chlorine which corresponds to a product of the structure:

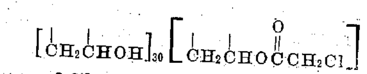

A mixture of 20 parts of this partial chloracetate of polyvinyl alcohol, 140 parts of ethanol, 40 parts of water and 8 parts of m-aminophenol is stirred at 75° for eight hours. The polymer is precipitated by the addition of 500 parts of methanol. After washing with four changes of methanol of 500 parts each, the product is filtered and dried to give a light tan solid which gives a clear, nearly colorless solution in 20% ethanol. The product has the following approximate composition:

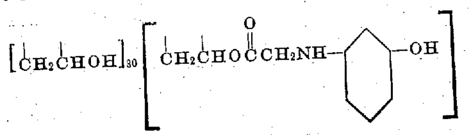

Ten parts of this polymer are used in the manner described in Example I. The resulting paper and film contained a bright blue negative quinoneimine dye image.

*Example III*

A mixture of 50 parts of the partial chloracetate of polyvinyl alcohol of Example II, 150 parts of ethanol, 50 parts of water and 25 parts of sodium-1-hydroxy-2-naphthalene sulfonate, is stirred at 70° for six hours, then precipitated by the addition of 500 parts of methanol. The precipitate is washed with four changes of methanol (500 parts each), two changes of acetone (500 parts each), then filtered and dried. This material contains the following probable color unit structure:

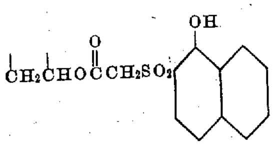

Ten parts of this polymer are used in place of the color forming polymer of Example I as described in that example. Similar results are obtained.

*Example IV*

A mixture of 50 parts of the polyvinyl partial chloroacetate of Example II, 150 parts of ethanol, 50 parts of water and 25 parts of N-(beta-aminoethyl)-1-naphthol-2-sulfonamide is stirred at 70° for six hours, keeping the pH at 8 by addition of sodium hydroxide (5% solution). The solution is worked up in the same manner used in Example III. The product having a color unit structure as follows:

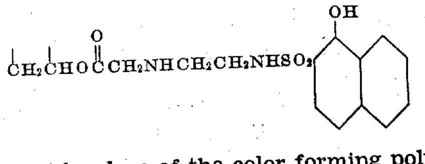

when used in place of the color forming polymer of Example I gives similar results.

*Example V*

A mixture of 50 parts of the polyvinyl alcohol partial chloroacetate of Example II, 150 parts of ethanol, 50 parts of water and 20 parts of 1(m-aminophenyl)-3-methyl-5-pyrazolone is stirred at 60° for six hours. The pH of the mixture is maintained at about 6 by the addition of 5% sodium carbonate during the reaction. The product is precipitated from the reaction mixture by the addition of 1000 parts of methanol. It is washed in six changes of methanol of 400 parts each, then filtered and dried. The finished product having the following probable color unit structure:

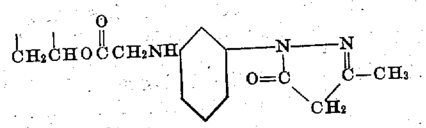

is used in preparing an emulsion and coating according to the procedure of Example I. On processing according to that example, brilliant magenta negative azomethine dye images are obtained.

*Example VI*

In the procedure of Example I, the naphthol carbonyl chloride is replaced by 56 parts of p-acetoacet-amidobenzoyl chloride. The resulting product has the following approximate color unit structure:

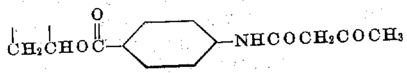

An emulsion is prepared and coated on paper and film base as in Example I. On processing according to that example, bright yellow negative azomethine dye images are obtained.

*Example VII*

Following the procedure of Example III, the color-former is replaced by the sodium salt of p-acetoacetamidobenzene sulfonamide. The resulting polymer has the following probable color unit structure:

Employing this polymer in the emulsion preparation and processing of Example I, bright yellow negative azomethine dye images are obtained.

*Example VIII*

A mixture of 50 parts of the chloroacetate of polyvinyl alcohol of Example II, 150 parts of ethanol and 50 parts of water is stirred with 25 parts of p-acetoacetaminothiophenol at 70° for six hours. During this time 10% sodium hydroxide solution is added to maintain the pH of the solution at about 8.5. The product is recovered by precipitation with 500 parts of acetone, washed with four changes of cold 80% methanol-water during 24 hours (500 cc. each), followed by two changes of acetone of 500 cc. each. After filtering and drying, a white granular material is obtained which has the following probable color unit structure:

When used in place of the polymer in Example I, strong yellow azomethine dye images are obtained.

*Example IX*

Thirty parts of a fast gelatin-silver iodobromide emulsion are melted at 40° and diluted with 300 parts of distilled water. This diluted emulsion is spun in a centrifuge until the silver halide is separated from the aqueous gelatin solution. After washing with warm water, 10 parts of this moist silver halide are dispersed in a solution of 10 parts of the hydrophilic polymeric dye intermediate ester of Example I dissolved in 200 parts of 20% ethanol-water. The resulting fast, light-sensitive color-forming dispersion is coated and processed as in Example I. The resulting elements contained bright blue-green negative quinoneimine dye images.

*Example X*

The light-sensitive coated films and papers of the above example are exposed and developed in a non-color-coupling photographic developer of the following composition:

| | Parts |
|---|---|
| Water | 975 |
| p-N-methylaminophenol sulfate | 2.5 |
| Sodium sulfite (anhydrous) | 75 |
| Hydroquinone | 3 |
| Sodium carbonate (anhydrous) | 30 |
| Potassium bromide | 2 |

washed, re-exposed or chemically fogged, then exposed and processed as the film in Example I, whereupon positive color images of the same colors are obtained.

*Example XI*

Figure 3:
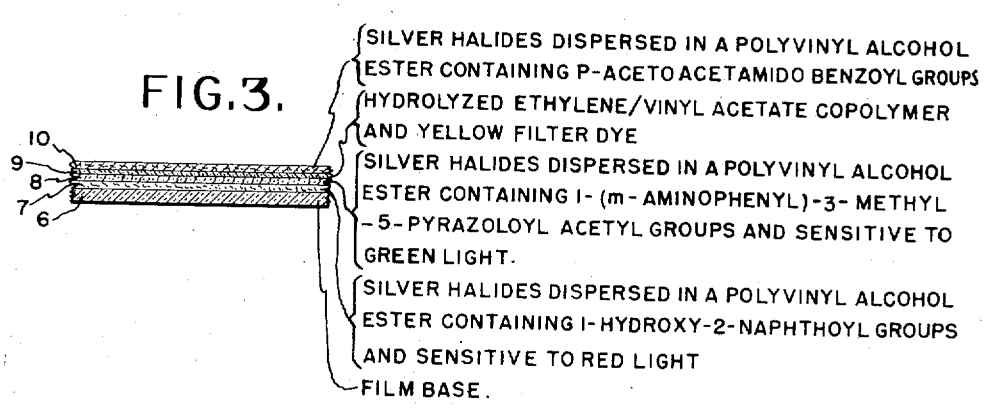

A monopack suitable for natural color reproduction is shown in Fig. 3 of the drawing. It is prepared by coating on a cellulose acetate film base 6 the following composition: The light-sensitive dye intermediate ester composition of Example I, which has been sensitized to the red region of the spectrum but not to the green by a green-blind red sensitizer, e. g., N,N'-diethylnaphthiocarbocyanine iodide forming layer 7 consisting of light-sensitive silver halides dispersed in a polyvinyl alcohol having a plurality of hydrogen atoms on hydroxyl groups replaced by 1-hydroxy-2-naphthoyl groups. Over this is coated a light-sensitive composition of Example V which has been sensitized to the green region with erythrosin thus forming layer 8 composed of light-sensitive silver halides dispersed in a polyvinyl alcohol having a plurality of hydrogen atoms attached to hydroxyl groups replaced by 1-(m-aminophenyl)-3-methyl-5-pyrazoloyl acetyl groups. Over this last mentioned layer is coated a layer 9 of a hydrolyzed interpolymer of vinyl acetate with 5% of ethylene containing a removable yellow filter dye to absorb blue light, e. g., tartrazine CI-640. Above this yellow filter layer is coated the blue-sensitive dye intermediate polymer composition of Example VI to form layer 10. This film element is exposed to a colored object scene whereby latent images representing different color component aspects are formed in the different layers. This film is then processed as in Example I using a ten minute development time. The resulting film is a color negative in which all of the colors are complementary to the original subject matter.

A second sample of this film is exposed as before and then processed by the following steps:

(1) Develop ten minutes in an ordinary black and white developer such as that of Example X.
(2) Wash ten minutes.
(3) Re-expose to white light and reduce the residual silver salt by treatment for 15 minutes in the dye coupling developer of Example I.
(4) Wash ten minutes.
(5) Bleach 7 minutes in a solution containing 3.5% potassium ferricyanide.
(6) Rinse.
(7) Remove bleached silver salts in a 25% solution of hypo (crystalline sodium thiosulfate).
(8) Wash 15 minutes and dry.

This procedure gives a color positive.

The color negative produced above may be printed onto an unexposed film of the same material using successive exposures of blue, green, and red lights which are substantially complementary to the colors of the dye generated in the layers and after processing by the method inn Example I using a ten-minute development, a color positive is also obtained.

*Example XII*

A heavy white baryta sized paper is coated as is the film of Example XI. This multilayer element is exposed under a color positive prepared as in Example XI and processed by reversal to a color positive. A piece of this paper may also be exposed under a color negative prepared as described in Example XI, then processed as in Example I using a ten minute development, to yield a positive color print having clear bright colors of good definition and freedom from stain.

*Example XIII*

A film prepared according to Example VII above is exposed and developed in the developer of Example I. After development, the film is washed and placed in a diazo solution prepared as follows: 1.73 parts of 2-chloro-4-nitroaniline dissolved in 5 parts of concentrated sulfuric acid is mixed with 0.7 part of sodium nitrite dissolved in 5 parts of concentrated sulfuric acid and, after thoroughly mixing, the solution is poured with rapid stirring into a mixture of 600 parts of water and 400 parts of ice. Following this 15 parts of sodium acetate and 7 parts of calcium hydroxide are added and the solution filtered at 5°. After two minutes in this solution, the film is placed in one molar hydrochloric acid at 5° for five minutes to wash out the excess of diazonium compound. The silver and developed coupling products are bleached by immersion for five minutes at 15° in an aqueous solution containing 10% copper sulfate, 5% potassium bromide, and 5% concentrated hydrochloric acid. After washing, the film is fixed in a standard potassium alum-thiosulfate bath, washed and dried to give a positive image in a brilliant yellow azo dye.

*Example XIV*

A film prepared according to Example V is exposed to an object, developed in a non-color forming developer of the type described in Example X, washed and dried. After re-exposure to white light, the film is color developed in a solution containing 96 parts of water, 5 parts of 2% sodium oleate, 2 parts of phenylhydrazine and 2 parts of sodium carbonate. The developed film, after washing, is bleached in 4% potassium ferricyanide solution and fixed. The film contains a yellow positive azo dye image.

Other color developing agents than those of Example I may be employed with these new color-yielding elements. Such developers contain a primary aromatic amino group which is ortho or para to a group taken from a class consisting of hydroxyl and $NR_2$ groups where the R is H, alkyl or substituted alkyl. Suitable developing agents of this type are described in United States Patent 2,297,732.

In addition these elements can be utilized in other processes of color photography as mentioned herein, which require dye intermediates, coupling components or color formers.

Many other color-forming acids than those of the above examples may be used in preparing these new color-forming binding agents. The following is a partial list of acids which can be converted to the acid halide and used in place of the 1-hydroxy-2-naphthoyl chloride of Example I to produce blue-green dyes:

1-hydroxy-2-naphthalene acetic acid
1-hydroxy-2-chloro-8-naphthoic acid
4(1-hydroxy-2-naphthalenesulfonamido) benzoic acid
4(1-hydroxy-2-naphthamido) benzoic acid
4-carboxy-N-(1-hydroxy-5-naphthyl)-benzene sulfonamide
2-hydroxy-3-phenylbenzoic acid
2-hydroxy-3-chlorobenzoic acid In place of the pyrazolone substituted benzoyl chloride of Example V other useful products can be prepared from the following compounds:

1-phenyl-3-carboxy-5-pyrazolone
(1-phenyl-5-pyrazolon-3-yl) acetic acid
4((3-methyl-5-pyrazolon-1-yl)benzenesulfonamido) benzoic acid
4((3-methyl-5-pyrazolon-1-yl) benzamido) benzoic acid
4(1-phenyl-5-pyrazolone-3'-carbonamido)-benzoic acid
p-Cyanoacetamidobenzoic acid
p-Cyanoacetyl benzoic acid For producing yellow color formers, the following acids may be employed for preparing acid halides for use in Example VII:

p-Carboxybenzoylacetanilide
o-, m-, or p-Furoylacetamidobenzoic acid
o-, m-, or p-Benzoylacetamidobenzoic acid
4(4'-acetoacetamidobenzenesulfonamido) benzoic acid
4(4'-acetoacetamidobenzamido) benzoic acid
N-phenylmalonamic acid
Ethyl 4-carboxyphenylmalonamic acid
4-carboxymalonanilide Other color formers containing groups capable of condensation with aliphatic halogen compounds by elimination of hydrogen halides can be used in place of the color formers of Examples II, III, IV, V, and VII. Typical of such color formers are the following:

2-mercapto-1-naphthol
p-(1-hydroxy-2-naphthalenesulfonamido)-benzene sulfinic acid
p-(1-hydroxy-2-naphthalenesulfonamido)-thiophenol
p-(1-hydroxy-2-naphthamido) benzene sulfinic acid
1(p-aminobenzoyl) amino-5-naphthol
1(p-mercaptophenyl)-3-methyl-5-pyrazolone
1(p-aminoacetamidophenyl)-3-methyl-5-pyrazolone
4-(3-methyl-5-pyrazolon-1-yl)benzene sulfinic acid
N-beta-aminoethyl(1-phenyl-5-pyrazolon-3-yl) acetamide
4-(cyanoacetamido) thiophenol
4-(cyanoacetyl) thiophenol
N-beta-aminoethyl-p-acetoacetamidobenzamide
N-beta-aminoethyl-p-acetoacetamidobenzenesulfonamide
p-Aminobenzoylacetanilide
N-phenyl-N'-beta-aminoethylmalonamide
Ethyl-N-p-mercaptophenylmalonamate In place of the partial chloroacetate of the above examples, a partial bromoacetate of the same degree of substitution can be employed with equal utility.

Other methods for preparing color forming esters of polyvinyl alcohol include esterification of polyvinyl alcohol with a nitro acid, e. g., nitrobenzoic acid to introduce nitrobenzoic groups on about 5% of the hydroxyl groups, followed by the reduction to the aminobenzoate which may then be condensed with color-forming acid chlorides, etc., as in Example I. In addition, the polyvinyl partial chloroacetate of Example II above may be converted to the polyvinyl glycinate by treatment with ammonia and used in similar manner.

Another method consists in partially esterifying polyvinyl alcohol with mercaptoacetic acid to replace about 5–10% of the hydroxyl groups by the group $—OCOCH_2SH$. Such a polymer can then be used in place of the polyvinyl partial chloroacetate of Example II for condensation with color formers containing replaceable halogen atoms, etc.

Various color-forming groups have different effects on the properties of the final color-forming polymers, that is, on viscosity, solubility, and permeability thereof. For this reason polyvinyl alcohols of different properties are sometimes required with different color formers. To decrease the solubility of a product, a higher viscosity polyvinyl alcohol may be used. However, a preferred method of decreasing the solubility of the final product is by use of a hydrolyzed interpolymer of vinyl acetate with 5% or less of an unsaturated compound taken from the class of terminally unsaturated monoolefins of four or less carbon atoms, arcylates, methacrylates, vinyl chloride, vinyl fluoride and vinyl cyanide.

To increase the solubility of the final product, a polyvinyl alcohol of lower viscosity may be used. Other useful methods of controlling the solubility and permeability include the reaction of part of the hydroxyl groups of the polymers with alkyl halides, acids, and aldehydes free from dye intermediate groups but designed to have the desired effect on the physical properties. Thus a decrease in solubility can be obtained by the presence of (1) acetate groups on 10–20% of hydroxyl groups, (2) butyrate or benzoate groups on 10% of the hydroxyl groups, (3) acetal groups, e. g., butyral or benzal groups on 5–10% of the hydroxyl groups. Likewise an increase in solubility can be obtained when the following substituents are present: (1) phthaldehydic acid acetal or glyoxylic acid acetal or benzaldehyde sulfonic acid acetal groups and their alkali metal salts on 5–20% of the hydroxyl groups, (2) half esters of dibasic acids, e. g., phthalic, succinic, etc., on 5–20% of the hydroxyl groups, (3) hydroxy acid ether groups on 5–20% of the hydroxyl groups. These groups can be introduced into the polymer before, during, or after condensation with the color former.

In addition to the color forming or dye intermediate groups of the above examples, many of the other well-known color-formers may be employed. Thus the color-forming nucleus may be any phenol, naphthol, or aromatic amines having a coupling position available, ortho or para to the aromatic hydroxyl or amine group, or any active methylene compound, i. e., a compound having a $—CH_2—$ group activated by two unsaturated groups taken from the class of $$-\overset{|}{C}=O$$

$$—C\equiv N,\ —NO_2,\ —C=N—$$

$$-\overset{|}{S}O_2$$

—CONH—, —COOalkyl, —COOaryl, connected directly or through a conjugated system. Such active methylene compounds are distinguished by their ability to have one of the hydrogen atoms of the methylene group replaced by alkali metal in aqueous solution and include many acyclic and heterocyclic compounds found in the art. Examples of such active acyclic and heterocyclic coupling compounds include (1) pyrazolones, e. g., 1-phenyl-3-methyl-5-pyrazolone, 1-phenyl-3-hydroxy-5-pyrazolone, 1-phenyl-3-methyl-5-pyrazolone imine, 1,3-diphenyl-5-pyrazolone; (2) beta-ketoamides of a type RCO—$CH_2CO$—NHR′, where R is hydrocarbon or heterocyclic radical and R′ is preferably aromatic, e. g., p-nitrobenzoylacetanilide, dibenzoylacetbenzidide, propionylacetanilide; (3) N-homophthalylamines, e. g., p-(N-homophthalylamino)benzoic acid, N-homophthaly-beta-naphthylamine; (4) indoxyl and thioindoxyl; (5) p-nitrobenzoyl cyanide; (6) malonamides, e. g., ethyl N-phenyl malonamate, N,N-diphenyl malonamides; (7) phenacyl pyridinium bromide; (8) hydroxypyridine; and (9) cyanoacetanilide.

The invention, moreover, is not limited to the specific light-sensitive material described in the above-detailed examples. On the contrary, various other simple and mixed silver halides may be used as the light-sensitive materials in like manner. Mixtures of silver bromides, chlorides and/or iodides can be made by adding mixtures of soluble salts of these halides in like manner. Other useful soluble halides include potassium bromide, potassium iodide, sodium and potassium chlorides and iodides, etc. Other useful soluble silver salts include silver sulfamate, silver sulfate, silver citrate and silver acetate.

The light-sensitive elements of this invention may be prepared by coating the silver halide-color-forming polyvinyl ester emulsions onto any of the usual supports commonly used in photography. Thus cellulose esters, e. g., cellulose acetate, collulose nitrate, acetylcellulose propionate, or vinyl polymers, e. g., polyvinyl butryal, polyvinyl benzal, polyvinal fluoride, polyvinyl chloride, or their interpolymers or superpolyamides may be cast into transparent films, subbed by the usual procedures and coated with the emulsions. Also paper sized with baryta or water-proofed paper or translucent film base may be used as the support or any other similar type of film or sheet.

Multilayer films other than those described in the above examples may be prepared according to this invention. Thus the layer for recording red light and producing the blue-green part image may be sensitized to green and red both and protected by a green absorbing red filter layer between it and the exposure, or the layers may be coated in a different order or one of these layers may be on the other side of the support. In addition the present invention may be applied to a two-color process by a suitable selection of dye intermediate nuclei and sensitizing compounds. Further, the invention can be combined with other processes for producing colored photographic images. For example, in the case of a three-color film, two-color images may be produced on one side of the support by the process of this invention whereas the remaining color image may be produced, for example, on the other side by toning or on the same side by an imbibition process.

The term "hydrophilic" as used in this application and claims when referring to a dye intermediate is intended to denote compounds which in the form of thin layers, e. g., 1 to 10 microns of thickness, are insoluble in water at 20° C., but are freely water-permeable.

An advantage of the new photographic elements of this invention resides in the increased stability of the dye images formed. Another advantage resides in the toughness and flexibility of the light-sensitive layers. They are far superior to gelatine in this respect.

A further advantage resides in the fact that these color-yielding layers can produce the maximum color density obtainable from the amount of silver salts reduced by the color coupling developer. This permits saving of the silver halides. The lower amount of silver halides is of major importance in multilayer films because the innermost layers receive light passing through the layers intervening the source of light. The less silver halide the upper layers contain, the less scattering of light there is and the more light passes through to the lower layer. This results in films having a higher degree of definition and resolution than is obtainable by the use of immobile color formers in gelatine layers.

The multilayer films provided by this invention contain a higher percentage of color-forming nuclei than is possible to attain by adding insoluble or high molecular weight color formers to gelatin-silver halide emulsions and permit the preparation of films having higher overall sensitivity and a higher degree of definition and resolution than is attainable in color former-gelatin-silver halide films.

In addition the light-sensitive color-yielding coating compositions hereof are more stable than gelatine emulsions. Thus they resist bacterial putrefaction and mold, and can be stored for a longer period of time before use. The film elements themselves also are unaffected by conditions of high humidity that cause gelatin-containing films to mold and become highly fogged.

The photographic elements of this invention are of wide utility in color photography. They may be utilized as a direct taking stock in the color development processes described in the above examples and are also useful in duplicating or copying and making color prints on paper. Multilayer films, as described above, may be processed by direct color development to a color negative, printed onto a similar film with white light or by exposure with blue, green, and red lights controlled by suitable filters adjusted to the spectral qualities of the dyes formed on color development and color sensitizers and the printed material again processed by direct color development to a color positive. Thus any number of color positives may be produced from a single color negative. Similarly by using a reversal procedure on both the taking and printing stock, color positives can be produced by reversal. Again any number of color prints can be produced. The color negatives or positives produced according to this invention can also be employed in securing separation negatives or positives by known processes of color separation.

These new elements have a broad utility in azo dye processes provided the proper dye coupling nuclei are attached to the polymer chains. In United States Patent 2,297,732 and United States Patent 2,342,620 are described methods for producing azo dye images involving color development and azo dye coupling steps. When the dye coupling nuclei of that invention are attached to the vinyl alcohol polymers to prepare products of the present invention, the film elements prepared from them may be processed to pictures containing azo dye images of exceptionally good quality and stability. These latter film elements may also be used in other azo processes. They may be employed with the hydrazine developers of United States Patent 2,220,929 under the process of United States Patent 2,339,213 whereby azo dyes are produced on color development with aromatic hydrazine reducing agent. This latter type of film is also useful in the catalytic bleach process employing silver or silver salt images. Thus the film after exposure and processing employing non-coupling developers to a film containing silver or silver salt images may be treated with a suitable diazonium compound to dye the layers uniformly in their appropriate colors. By use of the known catalytic bleach methods, this film may be processed to a color negative or positive, as desired.

In addition these films are useful in the known processes involving conversion of silver salt images to silver antidiazotate images followed by coupling to form azo dye images.

The new polymeric dye intermediates of the present invention are also useful in certain non-photographic dyeing applications. Thus they are useful in the process of United States patent applications of H. E. Woodward, Serial No. 411,261, now Patent No. 2,371,052, and J. E. Kirby, Serial No. 411,262, now Patent No. 2,397,454, wherein polymeric dye intermediates are spun in viscose yarn or other fibers or filaments followed by generation of the dye by treatment with a diazotized aromatic amine. Dyes produced in this way possess outstanding washing and laundering fastness.

As many widely different embodiments of this invention can be made without departing from the spirit and scope thereof, it is to be understood that the invention is not to be limited except as defined by the claims.

What is claimed is:

1. A photographic element comprising a support bearing at least one layer which is essentially composed of a vinyl alcohol polymer which has a plurality of the hydroxyl groups replaced by a radical of the formula $$-O\underset{\underset{O}{\|}}{C}-AQ$$

wherein A is a member of the group consisting of a single covalent bond and a bivalent organic radical and Q is a color former nucleus containing as an active group a structure of the formula $$X-(\overset{|}{C}=\overset{|}{C})_n-\overset{|}{C}=\overset{|}{C}H$$

where X is a member of the group consisting of —OH and —NHR, where R is a member taken from the group consisting of H and an aliphatic radical and $n$ is a number taken from the group consisting of 0 and 1 and finely divided silver halide grains which are uniformly dispersed throughout the polymer the color-forming polymer being hydrophilic in character, soluble to the extent of at least 5% by weight in a boiling mixture of water containing not more than 50% by weight of a water-miscible volatile organic solvent and insoluble in water below 30° C.

2. A photographic element comprising a support bearing at least one layer which essentially composed of a polyvinyl alcohol which has a plurality of the hydroxyl groups replaced by a radical of the formula $$-O\underset{\underset{O}{\|}}{C}-Q$$

wherein Q is attached to the carbonyl group through a single covalent bond and is a color former nucleus containing as an active group a structure of the formula $$X-(\overset{|}{C}=\overset{|}{C})_n-\overset{|}{C}=\overset{|}{C}H$$

where X is a member of the group consisting of —OH and —NHR, where R is a member taken from the group consisting of H and an aliphatic radical and $n$ is a number taken from the group consisting of 0 and 1 and finely divided silver halide grains which are uniformly dispersed throughout the polymer the color-forming polymer being hydrophilic in character, soluble to the extent of at least 5% by weight in a boiling mixture of water containing not more than 50% by weight of a water-miscible volatile organic solvent and insoluble in water below 30° C.

3. A photographic element comprising a support bearing at least one layer which is essentially composed of a hydrophilic color-former-substituted carboxylic acid ester of a vinyl alcohol polymer and finely divided silver halide grains which are uniformly dispersed throughout the polymer, said ester being soluble to the extent of at least 5% by weight in a boiling mixture of water containing not more than 50% by weight of a water-miscible volatile organic solvent but being insoluble in water below 30° C. and having between 1 and 10 color former groups and at least 40 hydroxyl groups per 100 chain atoms and a $$-CH_2\overset{|}{C}HOH$$

content of at least 50% by weight; said polymer having a plurality of the hydroxyl groups replaced by a radical of the formula $$-O\underset{\underset{O}{\|}}{C}-Q$$

where Q is attached to the carbonyl group through a single covalent bond and is a color former nucleus containing as an active group a structure of the formula $$X-(\overset{|}{C}=\overset{|}{C})_n-\overset{|}{C}=\overset{|}{C}H$$

where X is a member of the group consisting of —OH and —NHR, where R is a member taken from the group consisting of H and an aliphatic radical and $n$ is a number taken from the group consisting of 0 and 1.

4. In a multilayer film having a plurality of differentially sensitized color-yielding silver halide layers and a light filter layer composed of a hydrolyzed ethylene/vinyl acetate copolymer containing a yellow filter material said layers being so arranged and sensitized that they are adapted to record light from a primary color region of the spectrum, each of said silver halide layers being essentially composed of a hydrophilic color-former-substituted carboxylic acid ester of a vinyl alcohol polymer and finely divided silver halide grains which are uniformly dispersed throughout the polymer, said ester being soluble to the extent of at least 5% by weight in a boiling mixture of water containing not more than 50% by weight of a water-miscible volatile organic solvent and insoluble in water below 0° C. and having between 1 and 10 color former groups and at least 40 hydroxyl groups per 100 chain atoms and a $$-CH_2\overset{|}{C}HOH$$

content of at least 50% by weight; said polymer having a plurality of the hydroxyl groups replaced by a radical of the formula $$-O\underset{\overset{\|}{O}}{C}-Q$$

where is attached to the carbonyl group through a single covalent bond and is a color former nucleus containing as an active group a structure of the formula $$X-(\overset{|}{C}=\overset{|}{C})_n-\overset{|}{C}=\overset{|}{C}H$$

where X is a member of the group consisting of —OH and —NHR, where R is a member taken from the group consisting of H and an aliphatic radical and $n$ is a number taken from the group consisting of 0 and 1.

DAVID W. WOODWARD.

REFERENCES CITED

The following references are of record in the file of this patent:

UNITED STATES PATENTS

| Number | Name | Date |
| --- | --- | --- |
| 2,186,733 | Schneider et al. | Jan. 9, 1940 |
| 2,186,849 | Wilmanns et al. | Jan. 9, 1940 |
| 2,276,323 | Lowe | Mar. 17, 1942 |
| 2,282,001 | Russell et al. | May 5, 1942 |
| 2,292,575 | Loleit | Aug. 11, 1942 |
| 2,297,732 | Woodward | Oct. 6, 1942 |
| 2,304,939 | Mannes et al. | Dec. 15, 1942 |
| 2,306,410 | Schinzel | Dec. 29, 1942 |
| 2,310,943 | Dorough et al. | Feb. 16, 1943 |
| 2,320,422 | Frohlich | June 1, 1943 |
| 2,330,291 | Kirby | Sept. 28, 1943 |
| 2,367,511 | Lowe et al. | Jan. 16, 1945 |
| 2,397,865 | Jennings | Apr. 2, 1946 |

FOREIGN PATENTS

| Number | Country | Date |
| --- | --- | --- |
| 537,256 | Great Britain | June 16, 1941 |

Certificate of Correction

Patent No. 2,567,750 September 11, 1951

DAVID W. WOODWARD

It is hereby certified that error appears in the printed specification of the above numbered patent requiring correction as follows:

Column 2, line 23, for "carboyylic" read *carboxylic*; column 4, line 67, for "sentive" read *sensitive*; column 9, line 6, for "example" read *examples*; column 10, line 6, for "inn" read *in*; column 15, line 74, after "which" insert *is*; column 16, line 74, for "0° C." read *30° C.*; column 17, line 11, after "where" insert the letter *Q*;

and that the said Letters Patent should be read as corrected above, so that the same may conform to the record of the case in the Patent Office.

Signed and sealed this 25th day of December, A. D. 1951.

[SEAL]

THOMAS F. MURPHY,
*Assistant Commissioner of Patents.*